United States Patent
Kitamura

(10) Patent No.: US 7,292,857 B2
(45) Date of Patent: Nov. 6, 2007

(54) MOBILE STATION, RADIO COMMUNICATION SYSTEM, BASE STATION SWITCHING CONTROL METHOD, PROGRAM, AND RECORDING MEDIUM

(75) Inventor: Tsutomu Kitamura, Tokyo (JP)

(73) Assignee: NEC Corporation, Tokyo (JP)

( * ) Notice: Subject to any disclaimer, the term of this patent is extended or adjusted under 35 U.S.C. 154(b) by 116 days.

(21) Appl. No.: 11/141,028

(22) Filed: Jun. 1, 2005

(65) Prior Publication Data

US 2005/0266852 A1 Dec. 1, 2005

(30) Foreign Application Priority Data

Jun. 1, 2004 (JP) ............................. 2004-162800

(51) Int. Cl.
*H04Q 7/20* (2006.01)
(52) U.S. Cl. .................... 455/436; 455/440; 455/553; 455/512; 455/441; 455/443; 455/550.1; 455/437
(58) Field of Classification Search ............. 455/562.1, 455/525, 432.1, 436, 435.1, 435.2, 434, 437, 455/440, 443
See application file for complete search history.

(56) References Cited

U.S. PATENT DOCUMENTS

| 5,239,667 | A | * | 8/1993 | Kanai | .......................... | 455/10 |
|---|---|---|---|---|---|---|
| 5,628,052 | A | * | 5/1997 | DeSantis et al. | .......... | 455/562.1 |
| 5,913,168 | A | * | 6/1999 | Moreau et al. | .............. | 455/441 |
| 6,055,428 | A | | 4/2000 | Soliman | | |
| 6,108,541 | A | * | 8/2000 | Yazaki et al. | ................ | 455/434 |
| 6,745,034 | B2 | * | 6/2004 | Wang et al. | ................. | 455/441 |
| 7,082,305 | B2 | * | 7/2006 | Willars et al. | ............... | 455/441 |
| 2002/0147024 | A1 | * | 10/2002 | Wan | ........................... | 455/515 |
| 2005/0037798 | A1 | * | 2/2005 | Yamashita et al. | .......... | 455/525 |

FOREIGN PATENT DOCUMENTS

| JP | 2001-78242 | 3/2001 |
|---|---|---|
| JP | 2002-10313 | 1/2002 |
| JP | 2002-204181 | 7/2002 |
| WO | WO99/34627 | 7/1999 |

* cited by examiner

*Primary Examiner*—Jean Gelin
*Assistant Examiner*—Kwasi Karikari
(74) *Attorney, Agent, or Firm*—Young & Thompson

(57) ABSTRACT

A mobile station for communicating with a plurality of base stations, including: a field strength detecting circuit that detects a wave strength received from the base stations and outputs a received wave strength; and a base station switching control circuit that makes a comparison between the received wave strength and a first field strength threshold level, wherein, when the received wave strength is higher than the first field strength threshold level, data communication with one of the base stations which is in a connected state is performed, and when the received wave strength is lower than the first field strength threshold level, a search for base stations is performed.

19 Claims, 4 Drawing Sheets

MOBILE STATION, RADIO COMMUNICATION SYSTEM, BASE STATION SWITCHING CONTROL METHOD, PROGRAM, AND RECORDING MEDIUM

BACKGROUND OF THE INVENTION

1. Field of the Invention

The present invention relates to a mobile station, a radio communication system, a base station switching control method, a program, and a recording medium.

2. Description of the Related Art

Recent developments of communication of multimedia information involve expansion of communication capacities in digital mobile communication. This increases loads placed on the CPUs of mobile stations and creates a demand for further improvements in reliability of communication channel qualities.

International application published under the PCT WO99/34627 (Date of publication: Jul. 8, 1999) discloses a technique which restricts handover and changes handover threshold according to handover history and communication quality. This technique improves the quality of communication by lowering the frequency of unnecessary handovers. This technique also improves the quality of communication by enhancing the detection accuracy of base station switching timing.

Japanese patent laid-open publication JP 2001-078242 A (Date of publication: Mar. 23, 2001) also discloses a technique for improving the quality of communication, in which the quality of communication through communication channels is monitored and a switch of base stations is facilitated when the signal from the connected base station deteriorates. This technique is also capable of improving the quality of communication by enhancing the detection accuracy of base station switching timing.

Japanese patent laid-open publication JP 2002-010313 A (Date of publication: Jan. 11, 2002) concentrates on the fact that fading variations become more intense depending on the movement speed and also increases the possibility of selecting a most suitable base station by adopting a longer measuring time and a larger internal threshold when the movement speed is at high levels. A technique is also disclosed which adopts a shorter measuring time and a smaller internal threshold when the movement speed is at low levels. This technique searches for candidate base stations to which a switch is to be made.

Japanese patent laid-open publication JP 2002-204181 (Date of publication: Jul. 19, 2002) discloses a technique that considers the positional relation between a mobile station and a base station communicating with each other. When a mobile station and a base station are positioned close enough to perform stable communication, unnecessary operations of detecting multipaths from other base stations are prevented to reduce dissipated power consumption. This technique realizes reduction of power consumption which is a problem to be solved when using RAKE receivers.

However, there exist no techniques invented with a view to enhancing the reliability of communication channels by reducing packet loss caused during switching of base stations and by reducing burdens on the CPUs of mobile stations by controlling the switching of base stations.

SUMMARY OF THE INVENTION

An object of the present invention is to provide a mobile station, a radio communication system, a base station switching control method, a program, and a recording medium that detect base station switching timing in order to control the detection accuracy of the base station switching timing to improve the quality of communication.

According to a first aspect of the present invention, there is provided a mobile station for communicating with a plurality of base stations, including:

a field strength detecting circuit that detects a wave strength received from the base stations and outputs a received wave strength; and a base station switching control circuit that makes a comparison between the received wave strength and a first field strength threshold level, in which, when the received wave strength is higher than the first field strength threshold level, data communication with one of the base stations which is in a connected state is performed, and when the received wave strength is lower than the first field strength threshold level, a search for base stations is performed.

According to a second aspect of the invention, in the mobile station according to the first aspect of the invention, the base station switching control circuit further makes a comparison between the received wave strength and a second field strength threshold level that is lower than the first field strength threshold level, and when the received wave strength is lower than the second field strength threshold level, the base station switching control circuit provides control to switch to one of the base stations found by the search that provides a highest received wave strength.

According to a third aspect of the invention, in the mobile station according to the first aspect of the invention, when the received wave strength is higher than the first field strength threshold level, control is provided to lower a frequency with which the wave strength is detected and a frequency with which the comparison is made; and when the received wave strength is lower than the first field strength threshold level, control is provided to increase the frequency with which the wave strength is detected and the frequency with which the comparison is made.

According to a fourth aspect of the invention, the mobile station according to the first aspect of the invention further includes:

at least two antennas;

the field strength detecting circuit detecting the wave strength received from the base stations using one of the antennas and outputting the received wave strength, the base station switching control circuit making the comparison between the received wave strength and the first field strength threshold level and further making a comparison between the received wave strength and a second field strength threshold level that is lower than the first field strength threshold level, and a transmission control circuit that establishes connection with the base stations, in which:

when the received wave strength is higher than the first field strength threshold level, the transmission control circuit performs data communication with the connected base station;

when the received wave strength is lower than the first field strength threshold level and higher than the second field strength threshold level, the base station switching control circuit makes the search for base stations using the other antenna; and when the received wave strength is lower than the second field strength threshold level, a connection is established with one of the base stations found by the search that provides a highest received wave strength and control is provided to change the used antenna from the one antenna to the other antenna.

According to a fifth aspect of the invention, the mobile station according to the first aspect of the invention further includes a movement speed detecting circuit that detects a movement speed level of the mobile station, in which the base station switching control circuit provides control to change a frequency with which the received wave strength is compared with the first field strength threshold level and a frequency with which the received wave strength is compared with the second field strength threshold level depending on the detected movement speed level.

According to a sixth aspect of the invention, there is provided a radio communication system in which the mobile station and the plurality of base stations according to the first aspect communicate with each other, through radio channels.

According to a seventh aspect of the invention, there is provided a radio communication system in which the mobile station and the plurality of base stations according to the second aspect communicate with each other through radio channels.

According to an eighth aspect of the invention, there is provided a radio communication system in which the mobile station and the plurality of base stations according to the third aspect communicate with each other through radio channels.

According to a ninth aspect of the invention, there is provided a radio communication system in which the mobile station and the plurality of base stations according to the fourth aspect communicate with each other through radio channels.

According to a tenth aspect of the invention, there is provided a radio communication system in which the mobile station and the plurality of base stations according to the fifth aspect communicate with each other through radio channels.

According to an eleventh aspect of the invention, there is provided a base station switching control method for use with a mobile station for communicating with a plurality of base stations, including the steps of:

detecting a wave strength received from the base stations and outputting a received wave strength;

making a comparison between the received wave strength and a first field strength threshold level and a comparison between the received wave strength and a second field strength threshold level that is lower than the first field strength threshold level;

performing data communication with one of the base stations which is in a connected state when the received wave strength is higher than the first field strength threshold level;

making a search for base stations when the received wave strength is lower than the first field strength threshold level and higher than the second field strength threshold level; and switching to one of the base stations found by the search, which provides a highest received wave strength, when the received wave strength is lower than the second field strength threshold level.

According to a twelfth aspect of the invention, the base station switching control method according to the eleventh aspect of the invention further includes the steps of:

providing control to lower a frequency with which the wave strength is detected and a frequency with which the comparisons are made when the received wave strength is higher than the first field strength threshold level; and providing control to increase the frequency with which the wave strength is detected and the frequency with which the comparisons are made when the received wave strength is lower than the first field strength threshold level.

According to a thirteenth aspect of the invention, in the base station switching control method according to according to the eleventh aspect of the invention, the mobile station includes at least two antennas, and the method includes the steps of:

detecting the wave strength received from the base stations using one of the antennas and outputting the received wave strength;

making the comparison between the received wave strength and the first field strength threshold level and the comparison between the received wave strength and the second field strength threshold level that is lower than the first field strength threshold level;

establishing connection with the base stations;

maintaining the connection with the connected base station when the received wave strength is higher than the first field strength threshold level;

making the search for base stations using the other antenna of the antennas when the received wave strength is lower than the first field strength threshold level and higher than the second field strength threshold level; and establishing a connection with one of the base stations found by the search that provides a highest received wave strength when the received wave strength is lower than the second field strength threshold level and switching the used antenna from the one antenna to the other antenna.

According to a fourteenth aspect of the invention, the base station switching control method according to the eleventh aspect of the invention further includes the step of detecting a movement speed level of the mobile station and changing a frequency with which the received wave strength is compared with the first field strength threshold level and a frequency with which the received wave strength is compared with the second field strength threshold level depending on the detected movement speed level.

According to a fifteenth aspect of the invention, there is provided a program that causes a computer to perform base station switching control in a mobile station for communicating with a plurality of base stations, the program causing the computer to perform the steps of:

detecting a wave strength received from the base stations and outputting a received wave strength;

making a comparison between the received wave strength and a first field strength threshold level and a comparison between the received wave strength and a second field strength threshold level that is lower than the first field strength threshold level;

performing data communication with one of the base stations which is in a connected state when the received wave strength is higher than the first field strength threshold level;

making a search for base stations when the received wave strength is lower than the first field strength threshold level and higher than the second field strength threshold level; and switching to one of the base stations found by the search, which provides a highest received wave strength, when the received wave strength is lower than the second field strength threshold level.

According to a sixteenth aspect of the invention, the program according to the fifteenth aspect of the invention further causes a computer to execute the steps of:

providing control to lower a frequency with which the wave strength is detected and a frequency with which the comparisons are made when the received wave strength is higher than the first field strength threshold level; and providing control to increase the frequency with which the wave strength is detected and the frequency with which the comparisons are made when the received wave strength is lower than the first field strength threshold level.

According to a seventeenth aspect of the invention, in the program according to the fifteenth aspect of the invention, the mobile station includes at least two antennas, and the program further causes the computer to perform the steps of:

detecting the wave strength received from the base stations using one of the antennas and outputting the received wave strength;

making the comparison between the received wave strength and the first field strength threshold level and the comparison between the received wave strength and the second field strength threshold level that is lower than the first field strength threshold level;

establishing connection with the base stations;

maintaining the connection with the connected base station when the received wave strength is higher than the first field strength threshold level;

making the search for base stations using the other antenna of the antennas when the received wave strength is lower than the first field strength threshold level and higher than the second field strength threshold level; and establishing a connection with one of the base stations found by the search that provides a highest received wave strength when the received wave strength is lower than the second field strength threshold level and switching the used antenna from the one antenna to the other antenna.

According to an eighteenth aspect of the invention, the program according to the fifteenth aspect of the invention causes the computer to further perform the step of detecting a movement speed level of the mobile station and changing a frequency with which the received wave strength is compared with the first field strength threshold level and a frequency with which the received wave strength is compared with the second field strength threshold level depending on the detected movement speed level.

According to a nineteenth aspect of the invention, there is provided a computer-readable recording medium that records the program according to the fifteenth aspect.

According to a twentieth aspect of the present invention, there is provided a mobile station for communicating with a plurality of base stations, including: means for detecting a wave strength received from the base stations and outputting the received wave strength; means for making a comparison between the received wave strength and a first field strength threshold level, and means for making a comparison between the received wave strength and a second field strength threshold level that is lower than the first field strength threshold level.

According to the present invention, when a wave strength received from a base station is lower than the first field strength threshold level 1, the frequency of comparisons between the wave strength received from the base station and the second field strength threshold level 2 is increased so as to prevent delay in timing of starting a switch of base stations, which reduces packet loss caused during the switch of base stations. When a wave strength received from a base station is higher than the first field strength threshold level 1 and so stable communication is possible, the frequency of comparisons between the wave strength received from the base station and the second field strength threshold level 2 is lowered to reduce the burden placed on the CPU of the mobile station. This significantly contributes to improvement of channel reliability.

BRIEF DESCRIPTION OF THE DRAWINGS

These and other aspects, features and advantages of the invention will become more fully apparent from the following detailed description taken in conjunction with accompanying drawings. In the drawings.

DETAILED DESCRIPTION OF THE EMBODIMENTS

First Embodiment

Figure 1:
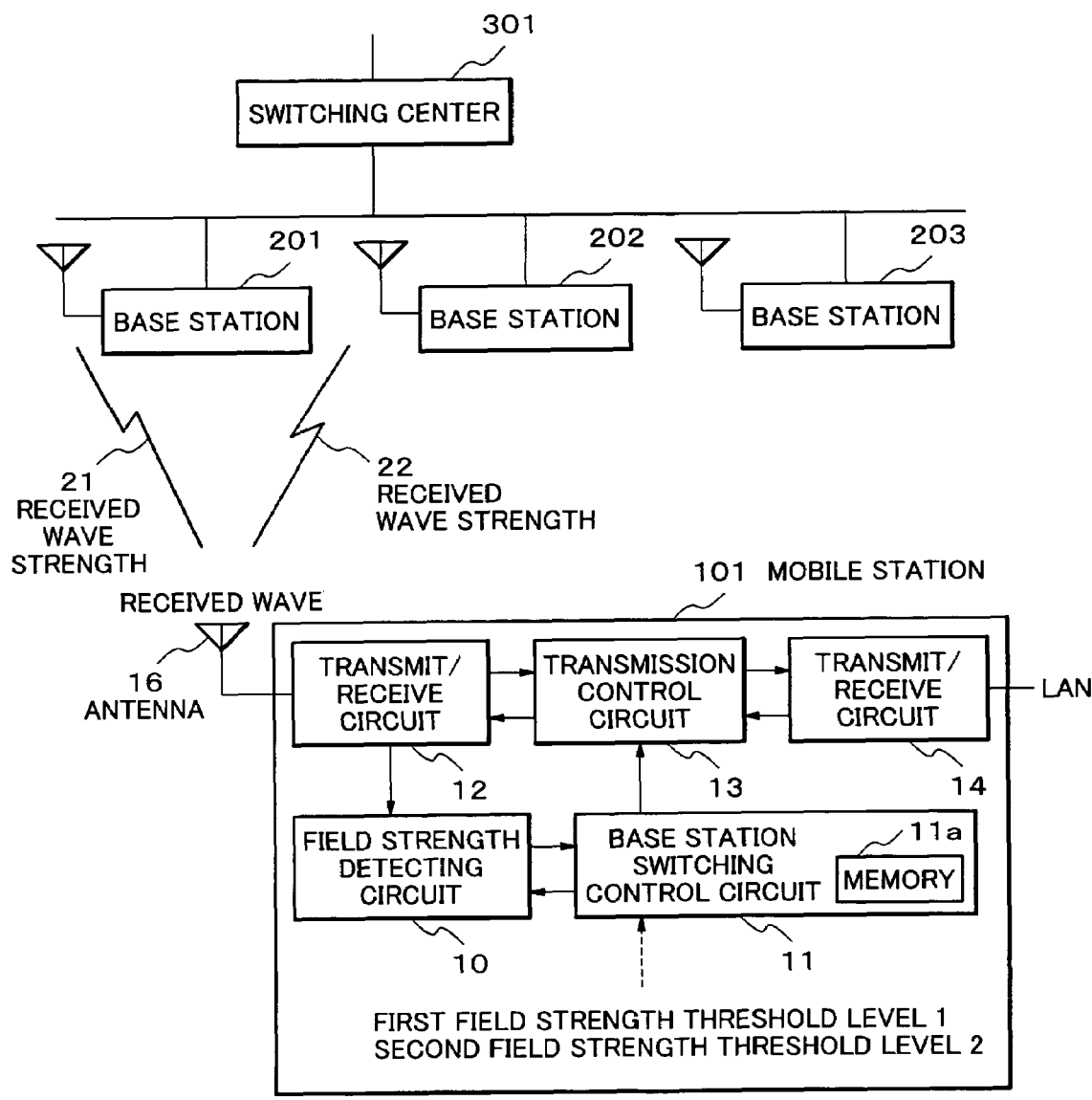
FIG. 1 is a block diagram showing a system configuration according to a first embodiment of the present invention.

FIG. 1 is a block diagram showing a system configuration according to a first embodiment of the present invention. FIG. 1 shows an example system applied to a mobile station carried on a superexpress (the Shinkansen) or a mobile body moving at high speed. The system of the first embodiment includes a switching center 301, base stations 201, 202, and 203, and a mobile station 101. The mobile station 101 moves between the plurality of base stations (the base stations 201, 202, and 203). The mobile station 101 is also capable of transferring signals received through radio channels, to a LAN (Local Area Network) in the vehicle.

The mobile station 101 includes an antenna 16, a transmit/receive circuit 12, a transmit/receive circuit 14, a field strength detecting circuit 10, a base station switching control circuit 11, and a transmission control circuit 13. The antenna 16 and the transmit/receive circuit 12 transmit/receive radio signals. The transmit/receive circuit 14 performs transmission/reception with the LAN. The field strength detecting circuit 10 detects the field strength of a received signal and outputs a received wave strength. The base station switching control circuit 11 makes a comparison (a field strength comparison) between the received wave strength and a first field strength threshold level 1 and a comparison (a field strength comparison) between the received wave strength and a second field strength threshold level 2. The second field strength threshold level 2 is set to be lower than the first field strength threshold level 1. The first field strength threshold level 1 and the second field strength threshold level 2 thus set may be stored, for example, in a memory 11a in the base station switching control circuit 11. The transmission control circuit 13 performs MAC control and routing control.

Figure 2:
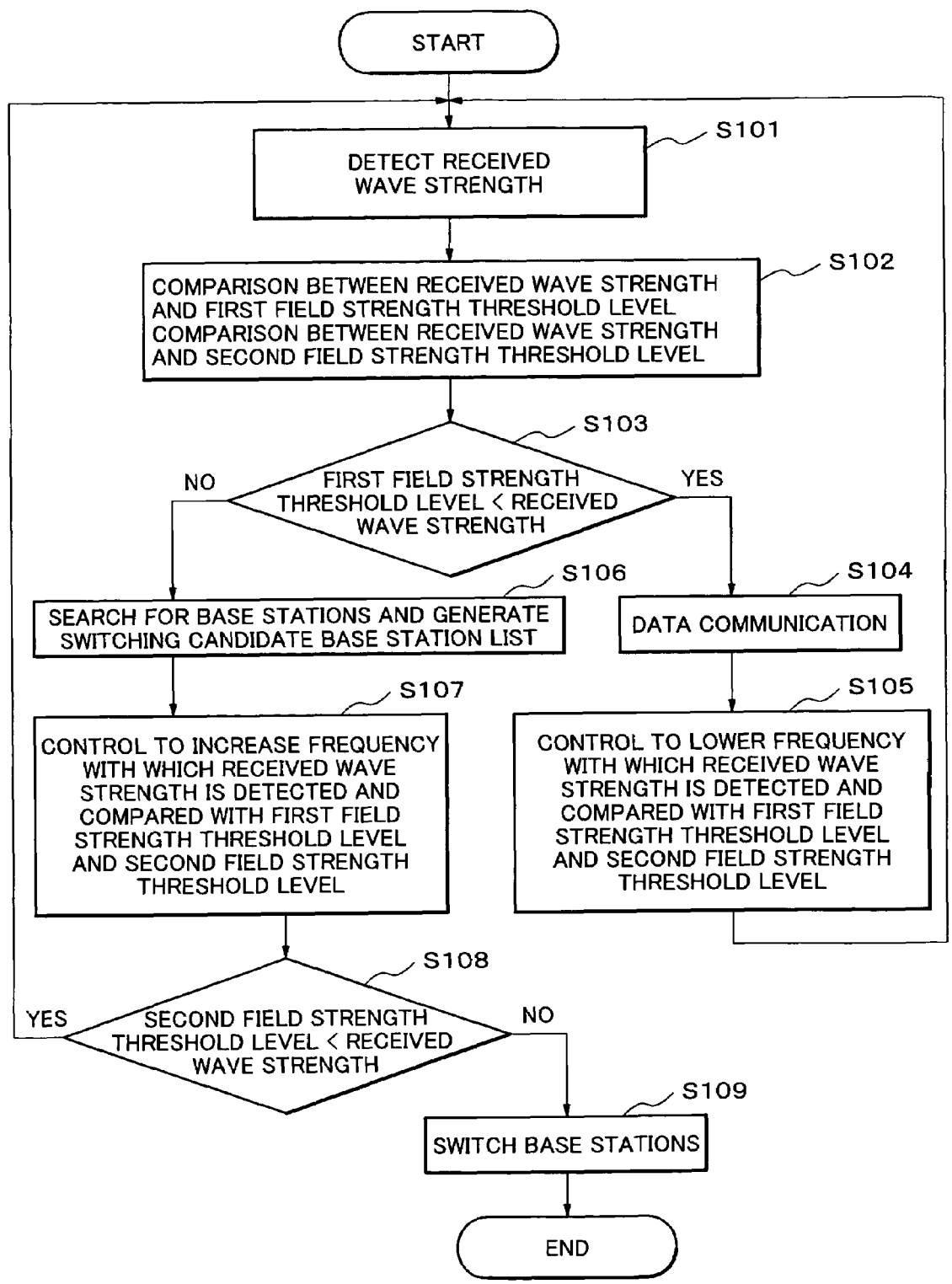
FIG. 2 is a flowchart of base station switching control according to the first embodiment of the present invention.

Next, the operation of the first embodiment will be described referring to the base station switching control flowchart of FIG. 2. The transmit/receive circuit 12 receives a signal from the base station 201 through the antenna 16 and the field strength detecting circuit 10 detects a received wave strength 21 (S101).

The detected received wave strength 21 is compared with the first field strength threshold level 1 in the base station switching control circuit 11. Next, the received wave strength 21 is compared with the second field strength threshold level 2 in the base station switching control circuit 11 (S102). When the comparison with the first field strength threshold level 1 shows that the received wave strength 21 is higher than the first field strength threshold level 1 (YES in S103), the mobile station 101 and the base station 201 perform data communication only (S104). The data communication is performed by the transmit/receive circuit 12, the transmission control circuit 13, and the transmit/receive circuit 14. Then, the base station switching control circuit 11 provides control to lower the frequency with which the received wave strength is detected for switching of base stations and makes a comparison between the received wave strength 21 and the first field strength threshold level 1 and a comparison between the received wave strength 21 and the second field strength threshold level 2 (S105). Thus, the frequency with which the received wave strength is detected and compared with the field strength threshold levels (the first field strength threshold level 1 and the second field strength threshold level 2) is set to be low. The base station switching control circuit 11 then instructs the field strength detecting circuit 10 to lower the detection frequency of the received wave strength. The flow then returns to the step S101.

When the level of the received wave strength 21 is lower than that of the first field strength threshold level 1 (NO in S103), the base station switching control circuit 11 starts a search for candidate base stations to which a switch is to be made and generates a switching candidate base station list (S106)

Next, the base station switching control circuit 11 provides control to increase the frequency with which the received wave strength is detected for the switching of base stations and with which a comparison is made between the received wave strength 21 and the first field strength threshold level 1. The base station switching control circuit 11 also provides control to increase the frequency of comparisons between the received wave strength 21 and the second field strength threshold level 2 (S107). Thus, the frequency with which the received wave strength is detected and compared with the field strength threshold levels is set to be high. Then, the base station switching control circuit 11 instructs the field strength detecting circuit 10 to increase the detection frequency of the received wave strength.

When the received wave strength 21 becomes lower than the second field strength threshold level 2 (NO in S108), a switch is started to a base station with the highest received wave strength (e.g., the base station 202) in the switching candidate base station list. That is, the base station switching control circuit 11 instructs the transmission control circuit 13 to switch to a base station that provides the highest received wave strength. The transmission control circuit 13 starts a connection to the target base station 202. The connection with the base station 202 is then completed and the switch of the mobile station 101 to the base station is completed (S109). When the received wave strength 21 is higher than the second field strength threshold level 2 (YES in S108), the flow returns to the step S101.

With the mobile station 101 of the first embodiment, two field strength threshold levels (the first field strength threshold level 1 and the second field strength threshold level 2) are provided for the wave strength received from the base station 201 and so the received wave strength is divided into three levels (high/medium/low). The frequency with which the wave strength is detected and compared with the field strength threshold levels is changed according to the received wave strength level. The mobile station 101 may use three or more field strength threshold levels to control the switching of base stations with more precision.

As described so far, the mobile station increases the frequency of comparisons between the wave strength received from the connected base station and the field strength threshold levels as the wave strength level received from the base station becomes lower. This makes it possible to quickly start a switch between base stations, thus providing the effect to reduce packet loss. Also, when the wave strength level received from the base station is high enough to perform stable communication, the frequency of comparisons between the wave strength received from the communicating base station and the field strength threshold levels is lowered, thus providing the effect to reduce the load on the CPU of the mobile station.

Second Embodiment

Figure 3:
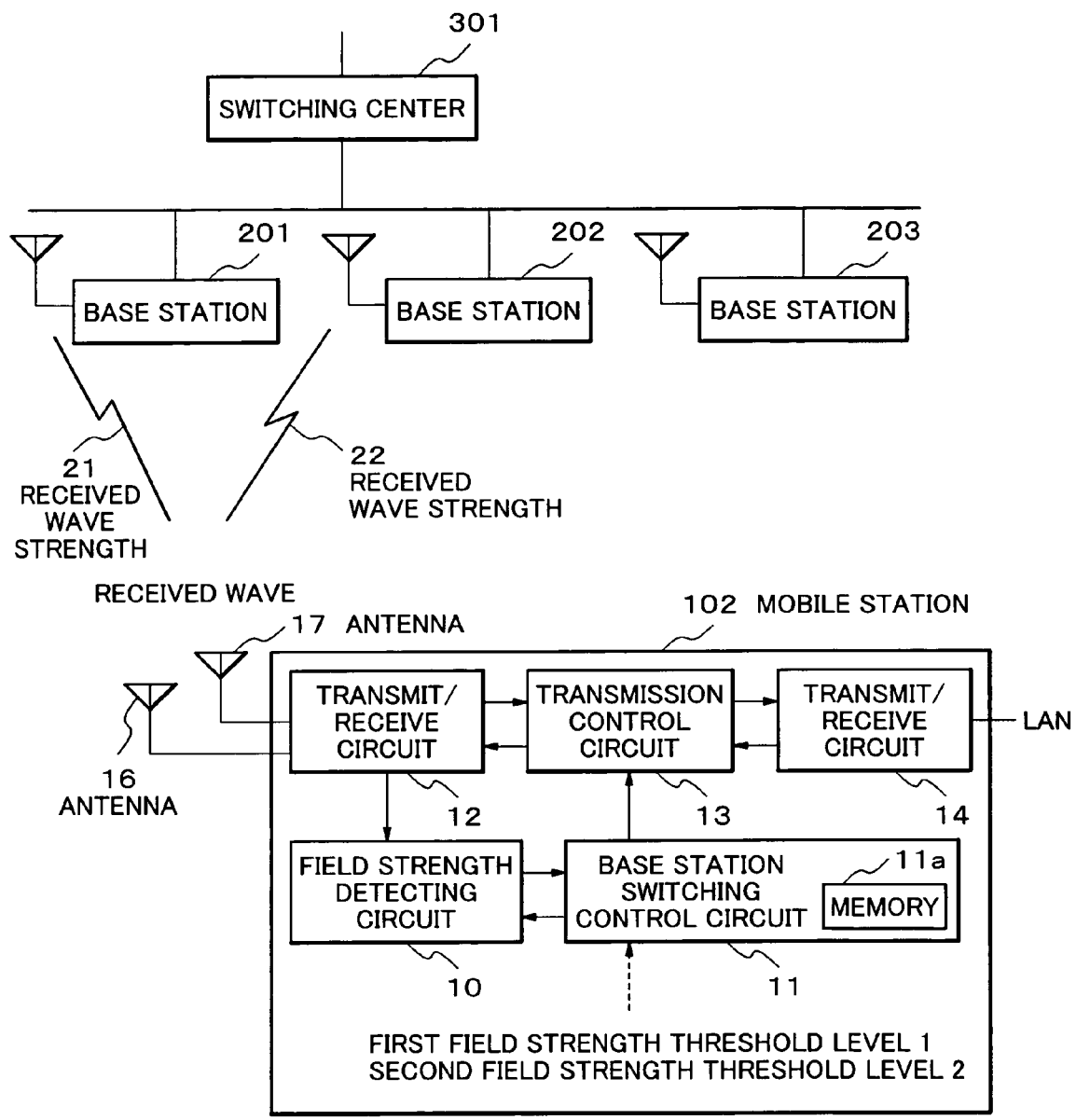
FIG. 3 is a block diagram showing a system configuration according to a second embodiment of the present invention.

FIG. 3 is a block diagram showing a system configuration according to a second embodiment of the present invention. The present invention is applicable also to a mobile station 102 having a plurality of antennas as shown in FIG. 3. The configuration of FIG. 3 differs from that of FIG. 1 in that the mobile station 102 further includes an antenna 17.

While the antenna 16 is being used for data communication through a connection with the base station 201, the antenna 17 is used to search for candidate base stations to which a switch is to be made. That is, when the detected received wave strength 21 becomes lower than the first field strength threshold level 1, the base station switching control circuit 11 searches for candidate base stations of switching using the antenna 17.

When a switch is made to a base station (e.g., the base station 202) that provides the highest received wave strength among the base stations thus found, a connection with the target base station 202 is first established using the antenna 17. Next, control is provided to switch the used antenna from the antenna 16 to the antenna 17 and the base station switching control is completed. Also, after changing the used antenna, the communication is controlled so that data from the base station 201 can be received using the antenna 16 for a given time period. The function is thus divided up between the antenna 16 and the antenna 17, which provides the effect to perfectly avoid packet loss during the switch of base stations.

Third Embodiment

Figure 4:
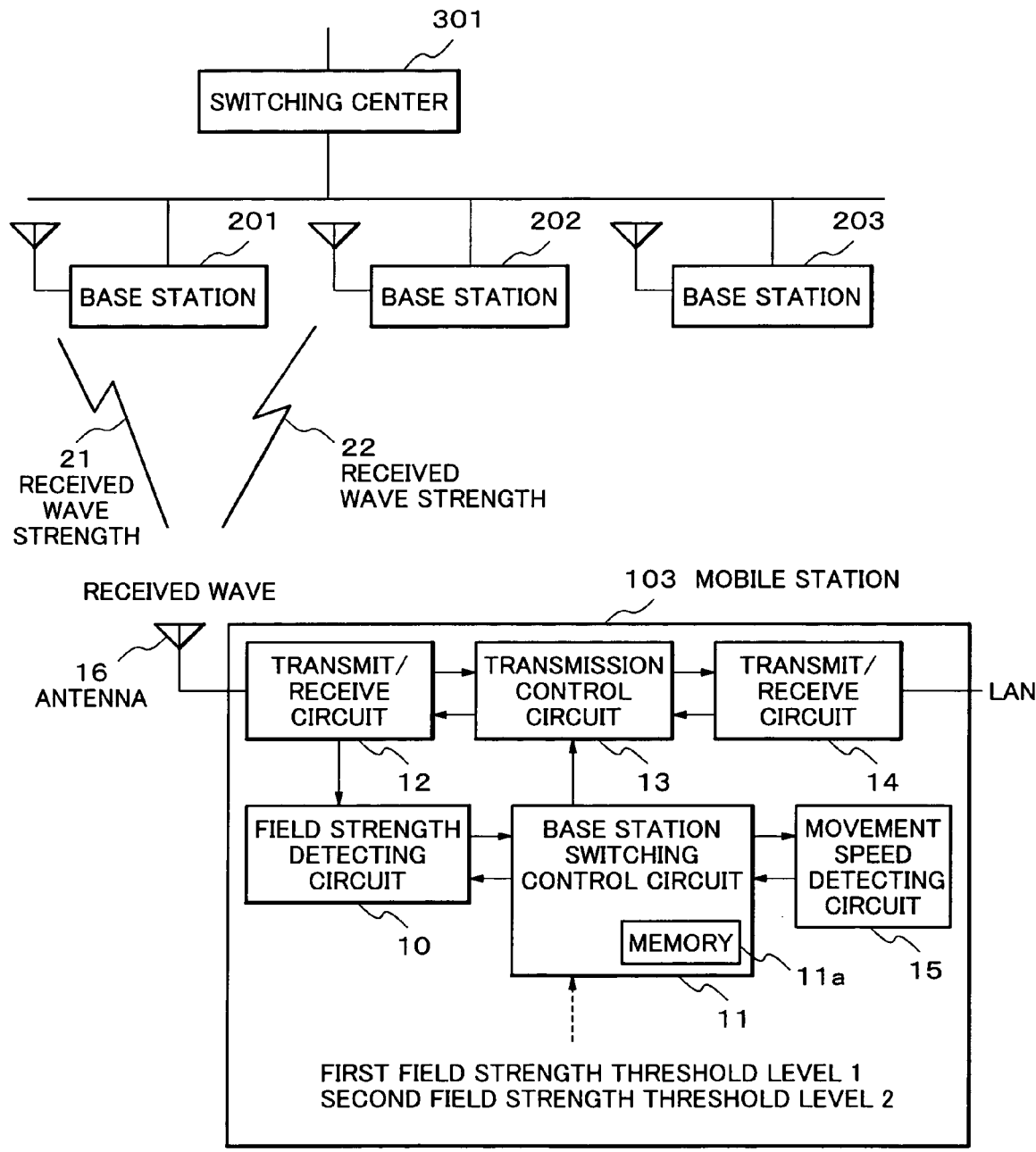
FIG. 4 is a block diagram showing a system configuration according to a third embodiment of the present invention.

FIG. 4 is a block diagram showing a system configuration according to a third embodiment of the present invention. The system configuration of FIG. 4 differs from that of FIG. 1 in that a mobile station 103 has a movement speed detecting circuit 15.

Using a base station switching signal outputted from the base station switching control circuit 11, the movement speed detecting circuit 15 obtains, for example, time intervals of switching of base stations and detects the level of movement speed. Then, according to the movement speed level, the base station switching control circuit 11 changes the frequency with which the wave strength of the signal received from the base station is detected and compared with the field strength threshold levels. That is, while the mobile station 103 is moving at high speed, control is provided to increase the frequency of comparisons between the wave strength received from the base station and the field strength threshold levels (the first field strength threshold level 1 and the second field strength threshold level 2). The frequency of comparisons with the field strength threshold levels is thus set to be high. On the other hand, while the mobile station 103 is moving at low speed, the base station switching control circuit 11 provides control to lower the frequency of comparisons with the field strength threshold levels. The frequency of comparisons with the field strength threshold levels is thus set to be low.

High-speed movements, as compared with low-speed movements, suffer larger variations in wave strength received from base stations, and therefore a timing delay in starting a switch of base stations causes severer packet loss. This embodiment provides the effect of reducing packet loss on the communications network side in switching base stations for a mobile station moving at high speed.

The operations described above according to the first to third embodiments are executable using a computer program described in a computer-readable programming language. For example, when the operations are executed with a computer program, a memory 11a capable of recording computer programs may be provided in the base station switching control circuit 11, and the computer program may be stored in the memory 11a. The base station switching control circuit 11 may read the computer program from the memory 11a and implement the above-described operations according to the computer program. A recording medium in which the computer program is stored may be set in the base station switching control circuit 11, and the base station switching control circuit 11 may read the computer program from the memory 11a and implement operations according to the computer program. The term "recording medium" include all medium that are capable of recording data. For example, the recording medium include compact disks, flexible disks, hard disks, magneto-optical disks, digital video disks, magnetic tapes, semiconductor memories, and so on.

The first to third embodiments described so far are meant just to be examples of preferred embodiments of the present invention, and numerous other modifications and variations can be devised without departing from the scope of the invention.

What is claimed is:

1. A mobile station for communicating with a plurality of base stations, comprising:
    a first antenna;
    a field strength detecting circuit that uses the first antenna to perform a wave strength detecting operation which detects a wave strength received from the base stations and outputs a received wave strength; and
    a base station switching control circuit that is provided with i) a first field strength threshold level which specifies a minimum wave strength to perform stable communication with a connected based station, and ii) a second field strength threshold level which specifies a minimum wave strength to continue communication with the connected base station for comparing with the received wave strength, and classifies the received wave strength into three classified strength levels of
    i) a first level which is higher than the first field strength threshold level,
    ii) a second level which is lower than the first field strength threshold level and higher than the second field strength threshold level, and
    iii) a third level which is lower than the second field strength threshold level,
    wherein,
    when the classified strength level is the first level, the base switching control circuit continues communication without performing a first operation of searching candidate base stations for switching over to a target base station,
    when the classified strength level has become the second level, the base station switching control circuit i) starts to perform the first operation for preparing for a second operation of switching over communication to the target one of the candidate base stations and ii) instructs the field strength detecting circuit to increase a frequency of the wave strength detecting operation, and
    the second operation is performed when the classified strength level has become the third level.

2. The mobile station according to claim 1, wherein when the classified strength level is the first level, the base station switching control circuit instructs the field strength detecting circuit to decrease the frequency of the wave strength detecting operation.

3. The mobile station according to claim 2, further comprising:
    a second antenna for the first operation and the second operation to be performed by the base station switching control circuit,
    wherein, when the second operation by the base station switching control circuit has been completed, the second antenna is switched for communication with the target base station.

4. A radio communication system in which the mobile station and the plurality of base stations according to claim 3 communicate with each other through radio channels.

5. The mobile station according to claim 2, further comprising:
    a movement speed detecting circuit that detects a movement speed level of the mobile station,
    wherein the base station switching control circuit provides control to change a frequency of comparing operation, in which the received wave strength is compared with the first field strength threshold level and the second field strength threshold level respectively, depending on the detected movement speed level.

6. A radio communication system in which the mobile station and the plurality of base stations according to claim 5 communicate with each other through radio channels.

7. A radio communication system in which the mobile station and the plurality of base stations according to claim 2 communicate with each other through radio channels.

8. A radio communication system in which the mobile station and the plurality of base stations according to claim 1 communicate with each other through radio channels.

9. A base station switching control method for use in a mobile station for communicating with a plurality of base stations, comprising:
    performing a wave strength detecting operation which detects a wave strength received from the base stations and outputs a received wave strength;
    comparing the received wave strength with a first field strength threshold level which specifies a minimum wave strength to perform stable communications with a connected base station, and with a second field strength threshold level which specifies a minimum wave strength to continue communication with the connected base station, the first field strength threshold level and the second field strength threshold level being predetermined in the mobile station; and
    classifying the received wave strength into three strength levels of
    i) a first level which is higher than the first field strength threshold level, ii) a second level which is lower than the first field strength threshold level and higher than the second field strength threshold level, and iii) a third level which is lower than the second field strength threshold level, wherein, i) continuing data communication with the connected base station without performing a first operation of searching candidate base stations for switching over occurs when the classified strength level is the first level, and ii) starting to perform the first operation for preparing a second operation, which is performed when the classified strength level has become the third level, of switching over communication to one of the candidate base stations and increasing a frequency of the wave strength detecting operation when the classified strength level has become the second level.

10. The base station switching control method according to claim 9, further comprising;

decreasing the frequency of the wave strength detecting operation when the classified strength level is the first level.

11. A base station switching control method according to claim 10, further comprising:

detecting a movement speed level of the mobile station; and changing a frequency of comparing operation, in which the received wave strength is compared with the first field strength threshold level and with the second field strength threshold level respectively, depending on the detected movement speed level.

12. A computer readable medium encoded with a program to perform base station switching control in a mobile station for communicating with a plurality of base stations, the program causing the computer to perform the steps of performing a wave strength detecting operation which detects a wave strength received from the base stations and outputs a received wave strength;

comparing the received wave strength with a first field strength threshold level which specifies a minimum wave strength to perform stable communications with a connected base station, and with a second field strength threshold level which specifies a minimum wave strength to continue communication with the connected base station, the first field strength threshold level and the second field strength threshold level being predetermined in the mobile station; and classifying the received wave strength into three strength levels of i) a first level which is higher than the first field strength threshold level, ii) a second level which is lower than the first field strength threshold level and higher than the second field strength threshold level, and iii) a third level which is lower than the second field strength threshold level, wherein, i) continuing data communication with the connected base station without performing a first operation of searching candidate base stations for switching over occurs when the classified strength level is the first level, and ii) starting to perform the first operation for preparing a second operation, which is performed when the classified strength level has become the third level, of switching over communication to one of the candidate base stations and increasing a frequency of the wave strength detecting operation when the classified strength level has become the second level.

13. The computer readable according to claim 12, further causing a computer to execute the step of:

decreasing the frequency of the wave strength detecting operation when the classified strength level is the first level.

14. The computer readable according to claim 13, further causing the computer to execute the steps of:

detecting a movement speed level of the mobile station; and changing a frequency of comparing operation, in which the received wave strength is compared with the first field strength threshold level and with the second field strength threshold level respectively, depending on the detected movement speed level.

15. A mobile communication system, comprising:

a plurality of base stations; and a mobile station, the mobile station comprising a first antenna, a second antenna, a field strength detecting circuit, and a base station switching control circuit, the field strength detecting circuit using one of the first and second antennas to perform a wave strength detecting operation which detects a wave strength received from the base stations and outputs a received wave strength, the base station switching control circuit provided with i) a first field strength threshold level which specifies a minimum wave strength to perform stable communication with a connected based station, and ii) a second field strength threshold level which specifies a minimum wave strength to continue communication with the connected base station for comparing with the received wave strength, and classifies the received wave strength into three classified strength levels of i) a first level which is higher than the first field strength threshold level, ii) a second level which is lower than the first field strength threshold level and higher than the second field strength threshold level, and iii) a third level which is lower than the second field strength threshold level, wherein, when the classified strength level is the first level, the base switching control circuit continues communication without performing a first operation of searching candidate base stations for switching over to a target base station, when the classified strength level has become the second level, the base station switching control circuit i) starts to perform the first operation for preparing for a second operation of switching over communication to the target one of the candidate base stations and ii) instructs the field strength detecting circuit to increase a frequency of the wave strength detecting operation, the second operation is performed when the classified strength level has become the third level, while one of the first and second antennas is being used for data communication with a connected base station, the base station switching control circuit uses another of the first and second antennas to search the candidate base stations for the target base station to which a switch is to be made during the second operation, and upon the switch being made by the second operation, the another antenna is given control for data communications to the newly connected target base station.

16. The mobile communication system of claim 15, wherein, for a limited given time period, data communications with the target base station is divided up between the one antenna and the another antenna to avoid packet loss during the switch of base stations.

17. The mobile communication system of claim 15, further comprising:
a moving vehicle containing a local area network and movable with respect to the base stations, wherein,
the mobile station is configured to be carried within the vehicle, and
the mobile station is configured for transferring signals received through radio channels to the local area network in the vehicle.

18. The mobile communication system of claim 17, further comprising:
a movement speed detecting circuit that detects a movement speed level of the mobile station,
wherein the base station switching control circuit provides control to change a frequency of comparing operation, in which the received wave strength is compared with the first field strength threshold level and the second field strength threshold level respectively, depending on the detected movement speed level so that when the mobile station moves to a higher speed, control is provided to increase the frequency of comparisons between the wave strength received from the base station and the field strength threshold levels and, when the mobile station moves to a lower speed, the base station switching control circuit provides control to lower the frequency of comparisons with the field strength threshold levels.

19. The mobile communication system of claim 15, further comprising:
a movement speed detecting circuit that detects a movement speed level of the mobile station,
wherein the base station switching control circuit provides control to change a frequency of comparing operation, in which the received wave strength is compared with the first field strength threshold level and the second field strength threshold level respectively, depending on the detected movement speed level.

* * * * *